US007227272B2

(12) United States Patent
Asada et al.

(10) Patent No.: US 7,227,272 B2
(45) Date of Patent: Jun. 5, 2007

(54) CONTROL APPARATUS FOR ELECTRICAL GENERATOR OF MOTOR VEHICLE

(75) Inventors: Tadatoshi Asada, Anjo (JP); Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 231 days.

(21) Appl. No.: 11/017,051

(22) Filed: Dec. 21, 2004

(65) Prior Publication Data

US 2005/0140143 A1 Jun. 30, 2005

(30) Foreign Application Priority Data

Dec. 25, 2003 (JP) ............................ 2003-430917

(51) Int. Cl.
*F02D 31/00* (2006.01)
*F02D 35/00* (2006.01)
*H02H 7/06* (2006.01)
*H02P 9/00* (2006.01)
*H02P 11/00* (2006.01)

(52) U.S. Cl. .......................... 290/40 A; 322/29; 123/2

(58) Field of Classification Search ............. 290/40 A; 322/29; 123/2
See application file for complete search history.

(56) References Cited

U.S. PATENT DOCUMENTS 4,313,080 A * 1/1982 Park .......................... 320/123
5,068,591 A * 11/1991 Hoegberg et al. ............. 322/29
5,444,354 A * 8/1995 Takahashi et al. ............ 322/28
5,469,816 A * 11/1995 Murakawa et al. ............ 123/2
5,495,162 A * 2/1996 Rozman et al. ............... 322/10
5,663,631 A * 9/1997 Kajiura et al. ................ 322/29
6,042,501 A * 3/2000 Yamamoto ................... 477/48
6,064,161 A * 5/2000 Takahara et al. ............ 318/139
6,215,285 B1 * 4/2001 Harmon ....................... 322/29
6,486,639 B1 * 11/2002 Montret et al. ............... 322/29
6,555,929 B1 * 4/2003 Eaton et al. .............. 290/40 B
6,624,617 B2 * 9/2003 Holzer et al. ................. 322/29
6,750,635 B2 * 6/2004 Harmon ....................... 322/29
6,889,126 B2 * 5/2005 Komiyama et al. ........... 701/22
6,900,618 B2 * 5/2005 Maehara ...................... 322/28
6,936,996 B2 * 8/2005 Uematsu et al. .............. 322/99
7,164,247 B2 * 1/2007 Joe et al. .................... 318/432
2004/0254695 A1 * 12/2004 Komiyama et al. ........... 701/22
2006/0221525 A1 * 10/2006 Konishi ..................... 361/93.1
2007/0021267 A1 * 1/2007 Obayashi et al. ........... 477/107

FOREIGN PATENT DOCUMENTS

JP U 58-162739 10/1983
JP U 61-125770 8/1986
JP A 61-247300 11/1986
JP U 62-099876 6/1987
JP U 03-006036 1/1991

* cited by examiner

*Primary Examiner*—Darren Schuberg
*Assistant Examiner*—Pedro J. Cuevas
(74) *Attorney, Agent, or Firm*—Oliff & Berridge, PLC

(57) ABSTRACT

A control apparatus such as an ECU, that controls the generator of a vehicle, measures the engine rotation speed and generator rotation speed while the engine is idling, and calculates and stores the ratio of the speed values. Thereafter when the vehicle is being driven and the current value of generator rotation speed is required, it is calculated based on the stored ratio value and the currently measured speed of the engine. The processing load on the ECU is thereby reduced, since generator rotation speed measurement processing is performed only in the idling condition.

14 Claims, 4 Drawing Sheets

CONTROL APPARATUS FOR ELECTRICAL GENERATOR OF MOTOR VEHICLE

CROSS-REFERENCE TO RELATED APPLICATIONS

This application is based on and incorporates herein by reference Japanese Patent Application No. 2003-430917 filed on Dec. 25, 2003.

BACKGROUND OF THE INVENTION

1. Field of Application

The present invention relates to a control apparatus that controls an electrical generator (referred to in the following simply as a generator) of a motor vehicle, and in particular to a control apparatus which derives and utilizes the speed of rotation of the rotor of an alternator that constitutes the generator.

2. Prior Art Technology

A generator of a motor vehicle is generally an alternator (typically, a 3-phase alternator) having a rotor that is driven by a belt and pulleys, or gears, from the vehicle engine. In the prior art, a type of control apparatus for a generator of a vehicle is known, that is implemented as an electronic control unit (hereinafter referred to as an ECU), with the ECU performing control in accordance with the speed of rotation of the alternator rotor (referred to in the following simply as the speed of rotation of the generator) or in accordance with the engine speed, assumed to be synchronized with that of the generator. In general, the ECU also controls the operation of the vehicle engine. Since the engine speed, and hence the generator speed of rotation, each vary in accordance with the running condition of the vehicle, it is necessary to measure the engine speed of rotation and the generator speed of rotation at frequent intervals, to enable accurate control by the ECU.

Such a control apparatus may include some form of detector device for directly detecting rotation of the generator, to thereby obtain a detection signal for use in measuring the speed of rotation of the generator, with such a signal being referred to in the following as the rotation speed measurement signal SNA. The rotation speed measurement signal SNA may be used internally by the ECU to measure the speed of rotation of the generator, for example as described in Japanese Patent Laid-open No. 62-99876, referred to in the following as reference document 1.

Alternatively, the control apparatus may include a sensor for detecting the engine rotation, with a resultant sensor signal being utilized internally by the ECU to measure the engine speed of rotation, and with control of the generator being performed based on the engine speed of rotation. This is described for example in Japanese Patent Laid-open No. 58-162739, referred to in the following as reference document 2.

With the technology of reference document 1, it is necessary to measure the speed of rotation of the generator each time the ECU is to perform control relating to the vehicle engine or the generator. Hence, the ECU must perform such measurement operations very frequently, so that the processing load that must be handled by the ECU is substantially increased, and the control performance of the ECU is thereby lowered.

On the other hand, with the method of reference document 2, it is not necessary to measure the speed of rotation of the generator at frequent intervals, since that can be calculated based on the engine speed of rotation. Such an ECU must in any case measure the engine speed, in order to control the engine operation, so that the problem of increased processing load on the ECU is avoided if the engine speed of rotation is used to derive the speed of rotation of the generator.

However in order to calculate the speed of rotation of the generator based on the engine speed of rotation, the ECU must use accurate information concerning the pulley ratio (or the gear ratio) by which the generator is driven from the engine. Such information must therefore be stored beforehand in each ECU, so that it is necessary to use a number of different types of ECU that store respectively different sets of such information, relating to various different vehicles. Thus, such a method has the disadvantage that the number of different types of ECUs that must be manufactured is increased.

It will be understood from the above that although the present invention is described from the aspect of a control apparatus for controlling the generator of a motor vehicle, such a control apparatus will in general be an apparatus such as an engine ECU which controls both the generator and the engine of the vehicle.

SUMMARY OF THE INVENTION

It is an objective of the present invention to overcome the above problems of the prior art, by providing a control apparatus for a generator of motor vehicle whereby the frequency of performing measurements of the speed of rotation of the generator (i.e., based on direct detection of the generator rotation) while the vehicle is being driven can be reduced, thereby reducing the processing load on an apparatus such as an ECU that controls the operation of the generator, and may also control the operation of the vehicle engine.

It is a further objective of the invention to provide a control apparatus for a generator of a motor vehicle, where the control apparatus includes an ECU, which can reduce the number of different types of ECUs that must be manufactured in order to provide a capability for controlling various different types of generator.

According to a first aspect, the invention provides a generator control apparatus for controlling an electrical generator that is driven from a vehicle engine, comprising generator rotation detection means for deriving a generator rotation detection signal varying in accordance with a speed of rotation of a rotor of the generator, generator rotation speed measurement means for operating on the generator rotation detection signal to derive a measured value of speed of rotation of the generator, engine rotation detection means for deriving an engine rotation detection signal varying in accordance with a speed of rotation of the engine, and engine rotation speed measurement means for operating on the engine rotation detection signal to derive a measured value of speed of rotation of the engine. The apparatus further includes rotation speed ratio calculation means for operating on each measured value of engine rotation speed and measured value of generator rotation speed, to calculate the ratio of the generator rotation speed to the engine rotation speed, and generator rotation speed calculation means for operating on the measured value of speed of rotation of the engine and the ratio of generator rotation speed to engine rotation speed, to obtain a calculated value of generator rotation speed. The rotation speed ratio calculation means are preferably provided with memory or register means, and controlled such as to perform ratio value calculations only while the vehicle engine is idling. In that way, as each new value of ratio is calculated, it is stored in the memory. When the vehicle begins to be driven, so that the engine is no longer idling, the generator rotation speed calculation means thereafter uses a ratio value that has been left stored in memory (in conjunction with the current value of engine rotation speed), to calculate the generator rotation speed.

Typically, such a generator control apparatus would be implemented as an ECU that controls the operation of both the electrical generator and the engine of a vehicle. Since it is not necessary for the ECU to perform measurements of the generator speed of rotation while the vehicle is actually being driven, the processing load on the ECU is substantially reduced (i.e., only a simple calculation is required, to obtain an updated generator rotation speed value, using the stored ratio value in conjunction with the engine speed of rotation).

A vehicle generator is generally an alternator, typically a 3-phase alternator. It is convenient to measure the generator speed of rotation based on the period of an AC voltage that it generates, i.e., a stator phase voltage. However the relationship between the generator speed of rotation and the stator phase voltage period depends upon the number of stator poles of the generator, or more specifically, the number of (N, S) pole-pairs of the stator of the generator. According to another aspect of the invention, when such a method of measuring the speed of rotation of the generator is used, with periods of a fixed-frequency clock signal being counted in order to measure the period of the stator phase voltage, means are provided whereby the clock signal frequency can be preset to one of a plurality of different values. These values are respectively predetermined to be appropriate for generators having different numbers of stator pole-pairs. In that way, it can be ensured that there will always be a fixed relationship between the count value that is obtained for the phase voltage period duration and the corresponding speed of rotation of the generator (more specifically, a fixed coefficient of proportionality), irrespective of the number of pole-pairs of the generator.

Hence, the generator speed of rotation can always be calculated in the same manner, irrespective of the type of generator that is installed in the vehicle.

From another aspect of the invention, the generator control apparatus can comprise a combination of a generator rotation speed derivation apparatus for deriving the measured values of generator rotation speed and a main control apparatus (which would typically be an ECU, that may also control the engine) coupled to receive the measured values of generator rotation speed, for deriving the calculated values of generator rotation speed and for controlling the generator accordingly. In that case, the generator rotation speed derivation apparatus includes means for transmitting the measured values of generator rotation speed to the main control apparatus, as respective sets of binary data, via a digital communication link.

With such a configuration, the generator rotation speed derivation apparatus preferably comprises memory means which store type information, i.e., information that can be used to distinguish the generator, with the type information also being transmitted to the main control apparatus via the digital communication link, as binary data. In addition, with such a configuration, the main control apparatus comprises memory means which store data that represent a plurality of control parameter characteristics, respectively corresponding to a plurality of different types of electrical generator, and means for selecting a specific one of the control parameter characteristics in accordance with the type information that is transmitted from the generator rotation speed derivation apparatus, with the main control apparatus performing control of the electrical generator in accordance with the selected control parameter characteristic.

In that way, it becomes possible to use a standard type of ECU for generator and engine control, in various different vehicle models, since the type information that is specific to each type of generator is stored in a device that is separate from the ECU. Thus, the number of different types of ECU that must be manufactured can be substantially reduced.

Alternatively, the memory means of the generator rotation speed derivation apparatus may have control parameter relationship information stored therein which is specific to that type of generator, with that information being transmitted to the main control apparatus via the digital communication link. With such a configuration, the memory means of the main control apparatus has data stored therein which represent a normalized control parameter characteristic, corresponding to a single type of electrical generator (i.e., appropriate for use in controlling that specific type of generator), and means for controlling the electrical generator that transmits the control parameter relationship information, in accordance with the normalized control parameter characteristic in conjunction with the transmitted control parameter relationship information. Such a method enables a reduction in the amount of memory capacity of the main control apparatus (e.g., ECU) that must be allocated to storing control parameter characteristics, such as characteristics expressing the relationship between levels of torque required to drive the generator and corresponding values of generator rotation speed.

DESCRIPTION OF PREFERRED EMBODIMENTS

First Embodiment

Figure 1:
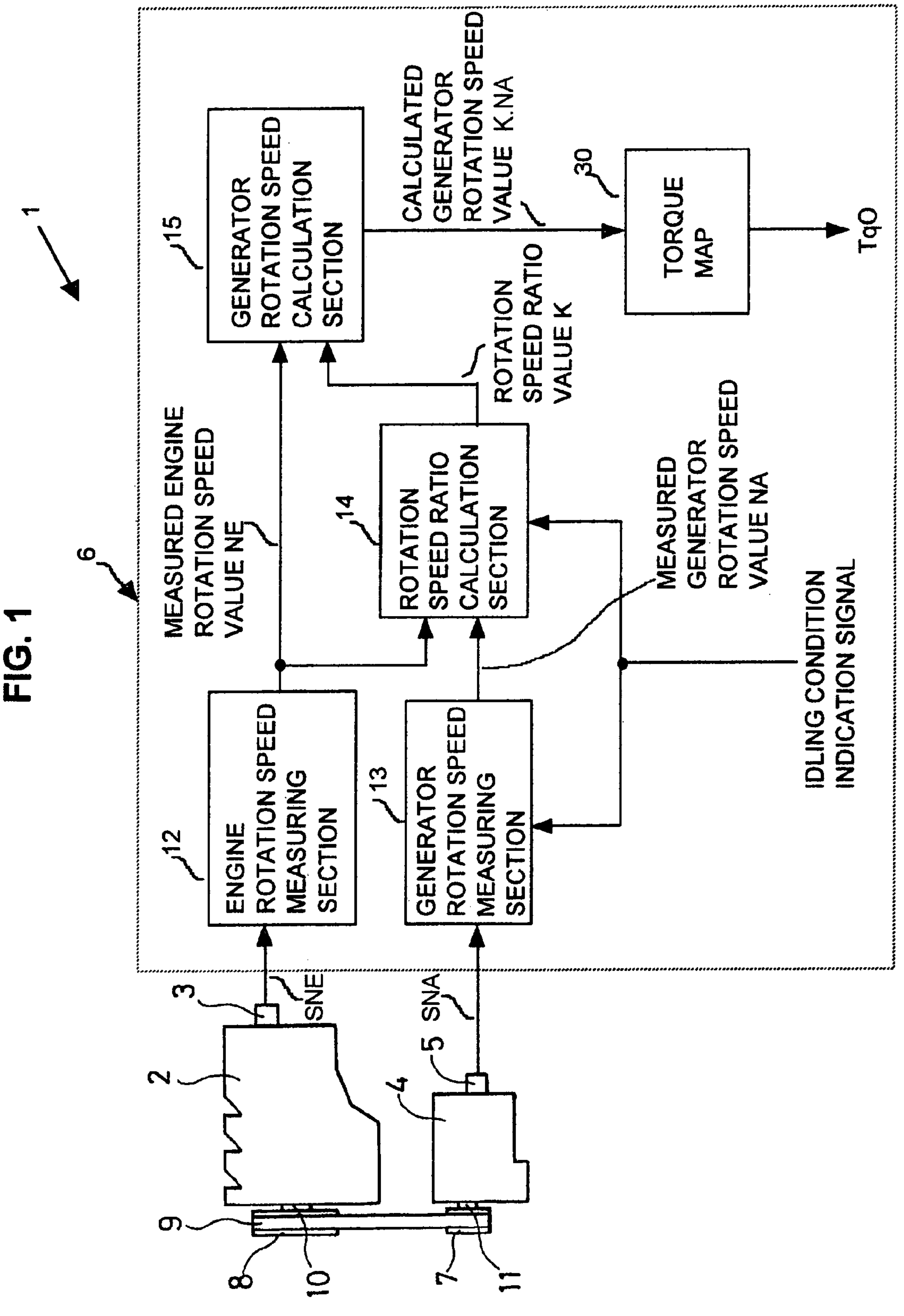
FIG. 1 shows the general configuration of a first embodiment of a control apparatus according to the present invention.

FIG. 1 is a general system diagram of a first embodiment of a control apparatus for a generator of a motor vehicle, with the control apparatus designated by reference numeral 1. The control apparatus 1 is made up of an ECU 6, a engine rotation sensor 3 and a generator rotation sensor 5. The engine rotation sensor 3 produces a sensor signal referred to in the following as the rotation speed measurement signal SNE, for use in measuring the engine speed of rotation for an engine 2, while the generator rotation sensor 5 produces a detection signal (i.e., the rotation speed measurement signal SNA), for use in measuring the speed of rotation of a rotor of a generator 4, which is driven from the crankshaft 10 of the engine 2 by a timing belt 9 acting on a pulley 8 of the crankshaft 10 and a pulley 7 of the shaft 11 of the generator 4.

The engine rotation sensor 3 can for example consist of a usual type of electromagnetic sensor, disposed close to teeth that are formed on a member (signal rotor) that is attached to the crankshaft 10, i.e., with the teeth protruding radially outward, with a voltage pulse being produced by electromagnetic induction as a detection signal by the sensor each time the crankshaft attains a specific angular position, to thereby constitute a rotation speed measurement signal SNE. The generator rotation sensor 5 can be similarly configured, with respect to the shaft 11 of the generator 4.

The ECU 6 is illustrated in conceptual form in FIG. 1, i.e., showing only those functions performed by the ECU 6 that are relevant to the present description. In practice, the ECU 6 is a microcomputer having a CPU for performing control functions and calculation functions, a memory, input/output section, etc., as is well known. The ECU 6 performs control of the engine 2 as well as the generator 4, based on the rotation speed measurement signal SNE and the rotation speed measurement signal SNA which are respectively supplied to the ECU 6 together with various other signals from other sensors, etc. (not shown in the drawings).

In the conceptual representation shown in FIG. 1, the ECU 6 includes an engine rotation speed measuring section 12 which receives the rotation speed measurement signal SNE and uses that to measure the engine speed of rotation, designated as NE and a generator rotation speed measuring section 13 which receives the rotation speed measurement signal SNA and uses that to measure the generator speed of rotation, designated as NA. The ECU 6 also includes a rotation speed ratio calculation section 14, a generator rotation speed calculation section 15 and a torque map 30 (i.e., represented by data that are fixedly stored in a memory such as a ROM of the ECU 6).

The following operation is performed at least once, after the engine 2 enters the idling condition. A pair of values for NE and NA are derived by the engine rotation speed measuring section 12 and the generator rotation speed measuring section 13 respectively, and are supplied to the rotation speed ratio calculation section 14, which calculates the ratio of NE to NA (with that ratio being designated as the rotation speed ratio K in the following) and stores the calculated value in a memory.

Each time it becomes necessary for the ECU 6 to obtain the speed of rotation of the generator 4, the value of the engine speed of rotation at that time is supplied by the engine rotation speed measuring section 12 to the generator rotation speed calculation section 15, which also receives the stored value of K from the rotation speed ratio calculation section 14. The generator rotation speed calculation section 15 thereby calculates the product of K and NA, to thereby obtain a calculated value for the speed of rotation of the generator.

Figure 2:
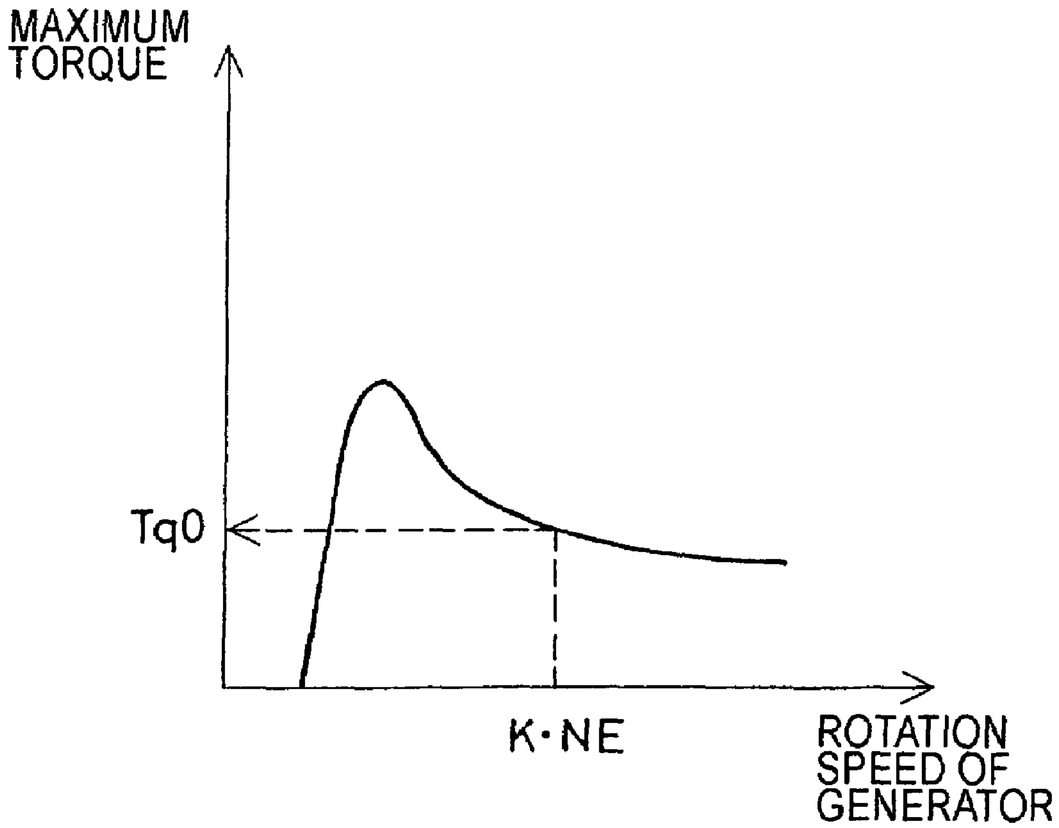
FIG. 2 shows a torque map expressing a relationship between values of generator speed of rotation and maximum required values of torque for driving the generator.

That calculated value is used internally in processing by the ECU 6, e.g., to derive values for control parameters of the generator 4, by obtaining a parameter value from a control parameter characteristic such as the torque map 30. In the case of the torque map 30, the obtained parameter is the maximum value of torque TqO that is required to drive the generator 4 at that point in time. An example of the information stored as the torque map 30 is shown as a graph in FIG. 2. The value of maximum torque that is thereby obtained is used by the ECU 6, e.g., to control the idling speed of the engine 2 in accordance with the required torque.

Each of the generator rotation speed measuring section 13 and rotation speed ratio calculation section 14 is supplied with an idling condition indication signal as shown, which attains a first logic level when the vehicle engine is in an idling condition (that is, the engine speed of rotation is below some predetermined level) and a second logic level when the engine is rotating at a higher speed than the idling condition. The generator rotation speed measuring section 13 is controlled to perform generator rotation speed measurement only while the idling condition indication signal is at the "idling condition" level, and otherwise to be held in an inoperative condition. The rotation speed ratio calculation section 14 is controlled to perform calculation of the rotation speed ratio K only while the idling condition indication signal is at the "idling condition" level, and otherwise to output only the most recently calculated value of K (i.e., which has been left stored as described above).

It can thus be understood that with this embodiment, measurement of the speed of rotation of the generator is performed only while the engine 2 is in the idling condition, e.g., immediately after starting of the engine has been performed. When the vehicle begins to be driven, at a higher engine speed, the generator rotation speed calculation section 15 derives successive values of the speed of rotation of the generator, when required by the ECU 6. However these values are calculated based on a stored value of the rotation speed ratio K and the currently measured value of the engine speed of rotation NE. Hence in that condition, no additional processing load is imposed on the ECU 6, for measuring successive values of the speed of rotation of the generator. The stored value of K continues to be used by the generator rotation speed calculation section 15 so long as the vehicle is being driven, i.e., is only updated when the engine 2 again enters the idling condition.

The above embodiment has the advantage that the rotation speed ratio K is always derived under a condition in which both the engine 2 and the generator 4 are operating at a low speed of rotation, so that their respective values of speed of rotation can be accurately measured by the engine rotation speed measuring section 12 and generator rotation speed measuring section 13 respectively. That is to say, during the idling condition, the engine speed of rotation will be substantially stable, thereby facilitating accurate measurement of that speed of rotation and the speed of rotation of the generator. Moreover, at a low speed of rotation, the period between successive detection voltage pulses produced by the engine rotation sensor 3 and generator rotation sensor 5 is accordingly long, so that accurate measurement of the period duration is facilitated, and so the accuracy of measurement of each speed of rotation is accordingly increased.

While the vehicle is being driven, no additional processing is performed by the ECU 6 for directly measuring the speed of rotation of the generator 4. Instead, the speed of rotation of the generator is obtained by multiplying the engine speed of rotation by a fixed factor (the stored value of the rotation speed ratio K). Thus, the control performance of the ECU 6 can be maintained at a high level while the vehicle is being driven.

Second Embodiment

A second embodiment of a control apparatus for a vehicle generator will be described referring to the general system diagram of FIG. 3. This embodiment basically differs from that of the first embodiment of FIG. 1 in that the function of the generator rotation speed measuring section 13 of the first embodiment (measuring the speed of rotation of the generator 4) is performed by a processing section 100 (referred to in the following as the generator speed measurement apparatus 100) that is implemented by a separate device from the ECU which controls the vehicle engine and the generator 4. That ECU of the second embodiment, designated by numeral 60, also performs the above-described functions of the engine rotation speed measuring section 12, rotation speed ratio calculation section 14 and generator rotation speed calculation section 15 of the first embodiment, and further description of these will be omitted.

The second embodiment also basically differs from the first embodiment in that data which specify the type of generator corresponding to the generator 4 are fixedly stored beforehand in a generator type information memory 22 of the generator speed measurement apparatus 100 and are transferred to the ECU 60 by serial data communication, together with data expressing the speed of rotation of the generator. More specifically, the latter data express the period of a stator phase voltage that is produced by the generator 4 as described in the following.

The second embodiment moreover also basically differs from the first embodiment in that the ECU 60 includes a memory in which are fixedly stored a plurality of different control parameter characteristics (such as torque maps) that are respectively appropriate for a plurality of different types of generator. When data expressing the type of a generator are transmitted to the ECU 60, the corresponding characteristic data are selected to be read out from memory, to be used in controlling the generator.

With the second embodiment, the vehicle generator 4 is a usual type of 3-phase AC generator having a 3-phase stator coil 17 and a field coil 16 whose current is controlled by the ECU 60, acting on a regulator transistor 19 (to thereby regulate an output voltage produced by a full-wave rectifier 18 that operates on the phase voltages of the generator 4). The speed of rotation of the generator is measured based upon the period of a stator phase voltage that is generated by one phase winding of the stator coil 17. With such a generator, the field coil 16 is wound around a plurality of pairs of (N, S) poles of the rotor of the generator 4, and if the number of pole-pairs of the rotor are known, then the speed of rotation of the generator can be calculated based on the duration of the period of the phase voltage.

Figure 3:
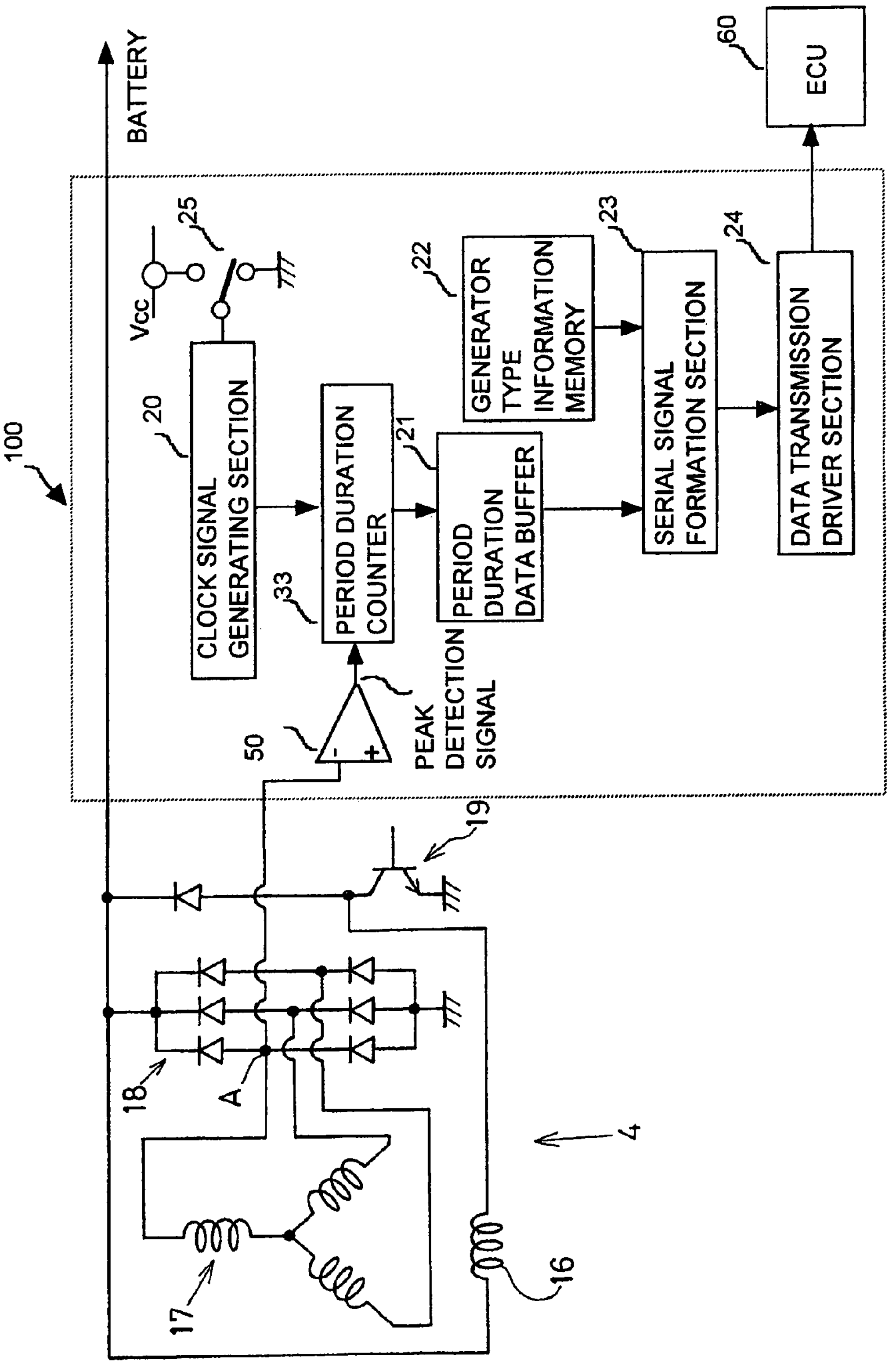
FIG. 3 shows the general configuration of a second embodiment of a control apparatus, in which a generator rotation speed measurement function is performed separately from an ECU that controls the generator.

As shown in FIG. 3, the generator speed measurement apparatus 100 includes a comparator 50 that detects successive voltage peaks of a phase voltage of the stator coil 17, appearing at point A, by comparing the phase voltage with a predetermined threshold value. The comparator 50 thus performs a function corresponding to that of the generator rotation sensor 5 of the first embodiment, to produce a peak detection signal that corresponds to the rotation speed measurement signal SNA of the first embodiment. The generator speed measurement apparatus 100 further includes a clock signal generating section 20, a period duration counter 33, a period duration data buffer 21, a generator type information memory 22, a serial signal formation section 23 and a data transmission driver section 24. The clock signal generating section 20 produces a clock signal, whose period can be selectively set to either of two fixed values as described hereinafter, by means of a changeover switch 25. The period duration counter 33 receives that clock signal and the peak detection signal from the comparator 50, and measures the duration of each period of the peak detection signal by counting the number of clock signal periods that occur within a period of the peak detection signal. It can thus be understood that the clock signal generating section 20 and the period duration counter 33, in combination, basically correspond in function to the generator rotation speed measuring section 13 of the first embodiment.

As each period duration value (i.e., clock period count value) is thereby obtained by the period duration counter 33, it is supplied to the period duration data buffer 21 to be held temporarily therein, and supplied from the period duration data buffer 21 to the serial signal formation section 23.

The generator type information memory 22 has fixedly stored therein the aforementioned data which specify the type of generator corresponding to the generator 4, and supplies these data (referred to in the following as the generator type data) to the serial signal formation section 23. Each time a period duration value is derived by the period duration counter 33 and supplied from the period duration data buffer 21 to the serial signal formation section 23, the serial signal formation section 23 combines that period duration value with the generator type data, as a set of binary data, which is supplied to the data transmission driver section 24. The data transmission driver section 24 then transmits that set as serial binary data, constituting an ECU transmission signal, to the ECU 60 via a data communication link. The ECU 60 of this embodiment includes a data receiving section (not shown in the drawings) for receiving the binary data transmitted from the data transmission driver section 24.

In the same way as for the ECU 6 of the first embodiment, the ECU 60 uses the data expressing the generator speed of rotation in conjunction with the engine speed of rotation (or the measured generator rotation period and measured engine rotation period) to calculate the rotation speed ratio K while the vehicle engine is in the idling condition, and to store the calculated value of K, for use while the vehicle is running.

Figure 5:
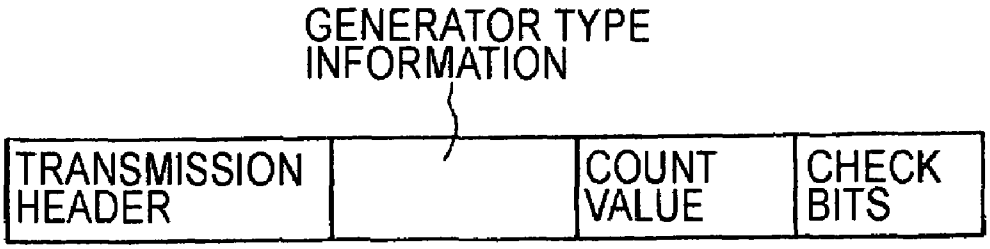
FIG. 5 shows the data format in which binary data expressing generator speed of rotation and generator type are transmitted in serial form to an ECU, with the third embodiment.

FIG. 5 shows the format of each set of serial binary data that are transmitted as an ECU transmission signal. As shown, this consists of a bit pattern constituting a transmission header, a set of bits constituting the generator type information, a set of bits which express the period duration value, i.e., as a count value, and a set of check bits for error detection purposes. The generator rotation period value is directly expressed as a binary number, as is the engine rotation period value that is derived in the ECU 60, and so can immediately be used in calculation processing when the ECU transmission signal has been received by the ECU 60.

Figure 4:
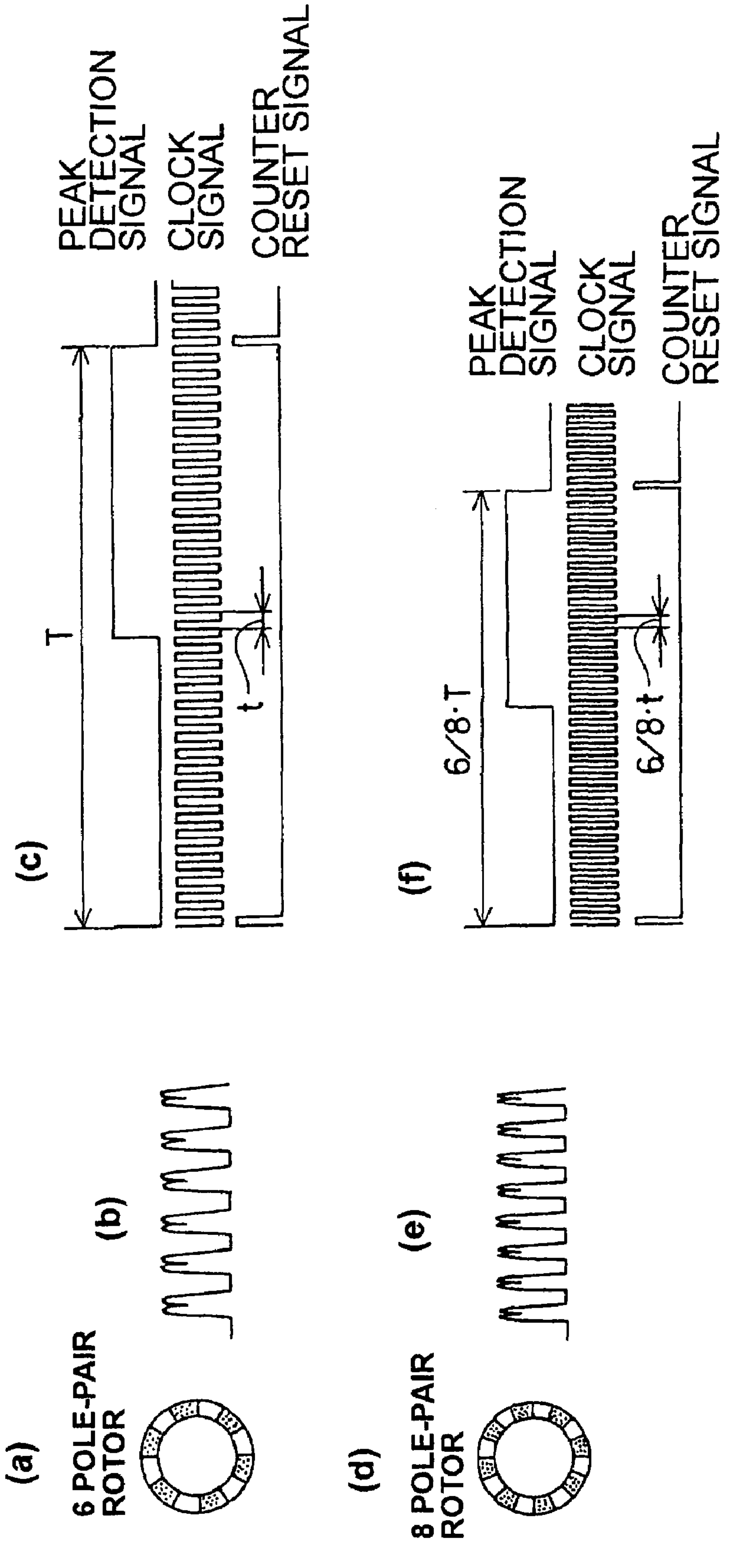
FIG. 4 shows diagrams for use in describing a feature of the second embodiment, whereby the period of a control signal used in measurement of the generator speed of rotation can be selected in accordance with a number of pole-pairs of the generator rotor.

It will be assumed that the generator 4 has a rotor with a 6 pole-pair configuration, as illustrated by diagram (a) in FIG. 4. In that case, each time the rotor moves through one revolution, six peak voltage occurrences will arise for the phase voltage that appears at point A in FIG. 3. If the rotor has an 8-pole-pair configuration, as illustrated by diagram (d) in FIG. 4, then each time the rotor moves through one revolution, there will be eight peak voltage occurrences of the phase voltage.

The changeover switch 25 of the generator speed measurement apparatus 100 can be preset to connect an input terminal of the clock signal generating section 20 either to ground potential or to a power supply potential Vcc, to thereby control the clock signal generating section 20 to generate the clock signal with a period t when the generator 4 has a 6 pole-pair rotor, and is controlled to generate the clock signal with a period (6/8)t when the generator 4 has an 8 pole-pair rotor. As shown in diagram (c) of FIG. 4 for the case of a 6 pole-pair rotor, in which the duration of a period of the peak detection signal is designated as T, when the period duration counter 33 has counted up to the number of clock signal periods corresponding to T, i.e., has obtained a period duration value, it is reset by a reset signal. The number of clock signal periods that have been counted, expressing the period T, is proportional to the speed of rotation of the generator 3. As shown in diagram (f) in FIG. 4, for an 8 pole-pair rotor, the period of the peak detection signal will be (6/8)T. Hence, since the control signal period is (6/8)t, the number of clock signal periods that have been counted, expressing the period (6/8)T, is proportional to the speed of rotation of the generator 3, with the same coefficient of proportionality as for the case of the 6-pole-pair rotor.

It can thus be understood that with this embodiment, the ECU 60 can measure the speed of rotation of the generator 4 by applying the same calculation to a period duration value (control signal count value) that is supplied from the generator speed measurement apparatus 100, irrespective of whether the generator 4 has a 6 pole-pair rotor or an 8 pole-pair rotor. The capability of this embodiment for selecting the control signal produced by the clock signal generating section 20 to have either a period t or a period (6/8)t is a valuable feature, since virtually every type of vehicle generator is either of 6 pole-pair or 8 pole-pair type.

It is another advantage of this embodiment that each period duration value is supplied to the ECU 60, by serial data communication, as a binary number, i.e., in the same form as the engine speed of rotation is represented within the ECU 60, so that the ECU 60 can directly calculate the rotation speed ratio K by operating on these two binary numbers.

Furthermore with this embodiment, when the ECU 60 receives the generator type information that is transmitted with a period duration value, it selects an appropriate control parameter characteristic, from among data representing a plurality of stored control parameter characteristics corresponding to respectively different types of generator, and uses the selected control parameter characteristic in controlling the operation of the generator 4. In that way, the number of different types of ECU that must be manufactured, for use in such an engine/generator control application, can be reduced, i.e., a standard type of ECU can be applied to various different vehicle models. In addition to the advantage of lower manufacturing costs, this also has the important advantage that there is a reduced danger of problems due to an incorrect type of ECU being installed in a vehicle.

Third Embodiment

A third embodiment of the invention differs from the second embodiment in that the ECU 60 has stored therein a normalized characteristic (such as a torque map) corresponding to a single type of vehicle generator. In that case, the data held stored in the generator type information memory 22 includes relative ratio information that is specific to the type of the generator 4, i.e., information that can be used by the ECU 60 to convert a normalized control parameter characteristic into a characteristic that is suitable for use in controlling the generator 4. The relative ratio information is transferred to the ECU 60 from the generator speed measurement apparatus 100 together with the generator type information, in the same manner as described for the generator type information with the second embodiment. When the relative ratio information is received by the ECU 60, it reads out the stored normalized control parameter characteristic data, and modifies these in accordance with the relative ratio information to derive a control parameter characteristic that is appropriate for the generator 4, then applies control of the generator 4 in accordance with that characteristic.

The third embodiment has the advantage that, in addition to reducing the number of different types of ECU that must be manufactured, it is only necessary for the ECU 60 to store data expressing one or more control parameter characteristics each relating to the same type of generator, so that the amount of data that must be held stored by the ECU 60 is greatly reduced by comparison with that of the second embodiment, while enabling such an ECU to be used to control various different types of vehicle generator.

Alternative Embodiments

The present invention has been described above referring to specific embodiments, for the case which assumes that the speed of rotation of the generator is directly measured, and the rotation speed ratio K is thereby calculated, only while the vehicle engine is in the idling condition. However the invention is not limited to this, and for example it would be possible to configure the apparatus such that these operations are performed while the vehicle is decelerating, with no ignition control or throttle control being applied to the engine, or when the vehicle becomes temporarily halted with the engine continuing to run.

Alternatively, it would be possible to store a value for the rotation speed ratio K in a memory, at the time of manufacture of the vehicle, or for a value of the rotation speed ratio K to be stored in memory when the vehicle is taken to a service center, etc., for maintenance.

Furthermore, the invention has been described above for the case in which the maximum torque value required to drive the generator is the generator control parameter. However the invention is not limited to this, and for example it would be possible to use the value derived for the speed of rotation of the generator to calculate the maximum amount of power that can be supplied by the generator.

Furthermore, a control parameter that is derived based on the speed of rotation of the generator could be made more accurate by taking into account the ambient operating temperature of the generator, the duty ratio with which ON/OFF switching control of the field current of the generator is being performed, etc.

Moreover with the third embodiment described above, the clock signal period can be selected from two different values. However it would be equally possible to arrange that the clock signal period can be selected from three or more different values. Furthermore, it would be possible to use a set of jumper terminals (i.e., which can be selectively bridged) instead of a switch, coupled to the clock signal generating section 20 shown in FIG. 3, for selecting the clock signal period from among a plurality of possible values.

It should also be noted that various combinations of the features of the above embodiments could be utilized, other than those described above. For example, with each embodiment, it would be possible to detect rotation of the generator by means of a sensor which directly detects the motion of the rotor shaft of the generator, as with the generator rotation sensor 5 of the first embodiment, or based on the period of an AC voltage that is produced by the generator, as with the comparator 50 of the second embodiment.

What is claimed is:

1. A generator control apparatus for controlling an electrical generator that is coupled to an engine of a vehicle to be driven thereby, the generator control apparatus comprising:

a generator rotation detection apparatus for deriving a generator rotation detection signal varying in accordance with a speed of rotation of a rotor of said generator;

generator rotation speed measurement circuitry adapted to operate on said generator rotation detection signal to derive successive measured values of speed of rotation of said generator;

an engine rotation detection apparatus for deriving an engine rotation detection signal varying in accordance with a speed of rotation of said engine; and engine rotation speed measurement circuitry adapted to operate on said engine rotation detection signal to derive successive measured values of speed of rotation of said engine, wherein said generator control apparatus comprises:

rotation speed ratio calculation circuitry adapted to operate on said measured values of engine rotation speed and measured value of generator rotation speed, in combination, during each of respective intervals in which said engine is running in a specific operating condition, to calculate a ratio of said generator rotation speed to said engine rotation speed, and generator rotation speed calculation circuitry adapted to operate on a currently measured value of speed of rotation of said engine and said ratio, in combination, to calculate a current value of said generator rotation speed.

2. A generator control apparatus according to claim 1, wherein said specific operating condition is an idling condition of said engine.

3. A generator control apparatus according to claim 1, wherein said rotation speed ratio calculation circuitry comprises a memory, said rotation speed ratio calculation circuitry stores each said calculated ratio of generator rotation speed to engine rotation speed in said memory, and said generator rotation speed calculation circuitry operates on a current value of said engine rotation speed in conjunction with a value of said ratio of generator rotation speed to engine rotation speed that is currently held stored in said memory, to calculate a current value of said generator rotation speed.

4. The generator control apparatus according to claim 1, wherein said generator rotation detection apparatus comprises circuitry coupled to a phase winding of said generator and adapted to detect a stator phase voltage of said generator, and said generator rotation speed measurement circuitry is adapted to generate a clock signal having a predetermined period and to measure said stator phase voltage period based on a ratio of respective values of a period of said stator phase voltage and said clock signal period;

wherein said generator rotation speed measurement circuitry comprises a selector device operable for presetting one of a plurality of different values of said clock signal period, in accordance with a configuration of poles of said rotor of said generator.

5. The generator control apparatus according to claim 1, further comprising circuitry adapted to transmit and receive each said measured value of generator rotation speed, as binary data, by digital communication between respective sections of said generator control apparatus.

6. The generator control apparatus according to claim 5, further comprising:

a first section and a second section, said first section comprising a memory having type information fixedly stored therein, said type information being indicative of a type of said generator, and being transmitted to said second section by said digital communication, wherein said second section comprises means for receiving said data transmitted by digital communication, a memory having fixedly stored therein data representing a plurality of control parameter characteristics respectively corresponding to a plurality of different types of electrical generator, and circuitry adapted to select a specific one of said control parameter characteristics in accordance with said transmitted type information, with control of said electrical generator being performed by said generator control apparatus in accordance with said selected control parameter characteristic.

7. The generator control apparatus according to claim 5, further comprising:

a first section and a second section, said second section comprising a memory having control parameter relationship information fixedly stored therein that is specific to said generator, said control parameter relationship information being transmitted to said second section of said generator control apparatus by said digital communication, wherein said second section comprises circuitry adapted to receive data transmitted by digital communication, and a memory having data fixedly stored therein representing a normalized control parameter characteristic corresponding to a single type of electrical generator, with control of said electrical generator being performed by said generator control apparatus in accordance with said normalized control parameter characteristic in conjunction with said transmitted control parameter relationship information.

8. The generator control apparatus according to claim 1, wherein said generator control apparatus comprises a combination of a generator rotation speed measurement apparatus for deriving said measured values of generator rotation speed and a main control apparatus coupled to receive said measured values of generator rotation speed, for deriving said calculated values of generator rotation speed and for controlling said generator;

wherein said generator rotation speed measurement apparatus comprises circuitry adapted to transmit a quantity expressing each said measured value of generator rotation speed to said main control apparatus, as binary data, by digital communication.

9. The generator control apparatus according to claim 8, wherein:

said generator rotation speed measurement apparatus comprises a memory having type information fixedly stored therein indicative of a type of said generator, and circuitry adapted to transmit said type information to said main control apparatus by said digital communication, and said main control apparatus comprises a memory having data fixedly stored therein representing a plurality of control parameter characteristics respectively corresponding to a plurality of different types of electrical generator, and said main control apparatus comprises circuitry adapted to select a specific one of said control parameter characteristics in accordance with said type information transmitted from said generator rotation speed measurement apparatus, with control of said electrical generator being performed in accordance with said selected control parameter characteristic.

10. The generator control apparatus according to claim 8, wherein:

said generator rotation speed measurement apparatus comprises a memory having control parameter relationship information that is specific to said generator fixedly stored therein, and comprises circuitry adapted to transmit said control parameter relationship information to said main control apparatus by said digital communication, and said main control apparatus comprises memory having data fixedly stored therein representing a normalized control parameter characteristic corresponding to a single type of electrical generator, and comprises circuitry adapted to control said electrical generator in accordance with said normalized control parameter characteristic in conjunction with said transmitted control parameter relationship information.

11. A generator control apparatus for controlling an electrical generator that is coupled to an engine of a vehicle to be driven thereby, the generator control apparatus comprising:

a generator rotation detector disposed adjacent to a rotor of said generator, for producing a generator rotation detection signal varying in period in accordance with a speed of rotation of said rotor;

generator rotation speed measurement circuitry adapted to operate on said generator rotation detection signal to derive successive measured values of speed of rotation of said generator;

an engine rotation detection apparatus for deriving an engine rotation detection signal varying in accordance with a speed of rotation of said engine; and engine rotation speed measurement circuitry adapted to operate on said engine rotation detection signal to derive successive measured values of speed of rotation of said engine, wherein said generator control apparatus comprises rotation speed ratio calculation circuitry adapted to operate on said measured value of engine rotation speed and measured value of generator rotation speed, in combination, during each of respective intervals in which said engine is running in a specific operating condition, to calculate a ratio of said generator rotation speed to said engine rotation speed, with said rotation speed ratio calculation circuitry comprising a memory for storing successively calculated values of said ratio, generator rotation speed calculation circuitry adapted to operate on a currently measured value of engine rotation speed and said stored ratio value, in combination, to calculate a current value of said generator rotation speed.

12. A generator control apparatus according to claim 11, wherein said specific operating condition is a condition of engine idling.

13. In a motor vehicle having an engine rotation detection apparatus for detecting rotation of an engine of said vehicle, and an electronic control apparatus having a memory for storing digital data and responsive to a detection signal from said rotation detection apparatus for measuring a current speed of rotation of said engine, a generator control apparatus for controlling an electrical generator that is driven by said engine, said generator control apparatus comprising:

a peak detection circuit coupled to receive a phase voltage of a phase winding of said electric generator, for producing a peak detection signal varying in period in accordance with a speed of rotation said electric generator;

clock signal generating circuitry for generating a clock signal having a predetermined period;

a selector device operable for presetting one of a plurality of different values of said clock signal period, in accordance with a configuration of poles of said rotor of said generator; and a counter circuit adapted to count said clock signal and controlled by said peak detection signal to be reset once in each period of said peak detection signal, wherein successive count values attained by said counter circuit are supplied to said electronic control apparatus as data expressing successive values of speed of rotation of said generator, and said electronic control apparatus is adapted to:

operate on said current value of engine rotation speed and said count values of said counter circuit to calculate a ratio of said generator rotation speed to said engine rotation speed, during each of respective intervals in which said engine is running in a specific operating condition, and store a most recently calculated value of said ratio in said memory, and operate on said current value of engine rotation speed and said stored ratio value, in combination, to calculate a current value of said generator rotation speed.

14. A generator control apparatus according to claim 13, wherein said specific operating condition is a condition of engine idling.

* * * * *